(12) United States Patent
Crawford et al.

(10) Patent No.: US 10,816,232 B2
(45) Date of Patent: Oct. 27, 2020

(54) SYSTEMS AND METHODS FOR PUMPING DOWN FLAMMABLE REFRIGERANT

(71) Applicant: Lennox Industries Inc., Richardson, TX (US)

(72) Inventors: Carl T. Crawford, Hickory Creek, TX (US); Umesh Gokhale, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 57 days.

(21) Appl. No.: 16/256,378

(22) Filed: Jan. 24, 2019

(65) Prior Publication Data

US 2020/0240661 A1 Jul. 30, 2020

(51) Int. Cl.
*F24F 11/36* (2018.01)
*F24F 11/84* (2018.01)
(Continued)

(52) U.S. Cl.
CPC .............. *F24F 11/36* (2018.01); *F24F 3/001* (2013.01); *F24F 11/64* (2018.01); *F24F 11/84* (2018.01); *F24F 11/86* (2018.01); *F25B 13/00* (2013.01); *F25B 41/04* (2013.01); *F25B 41/062* (2013.01); *F25B 45/00* (2013.01); *F25B 49/022* (2013.01); *F24F 2110/12* (2018.01); *F24F 2203/021* (2013.01); *F25B 2313/005* (2013.01); *F25B 2313/0293* (2013.01); *F25B 2341/065* (2013.01); *F25B 2345/006* (2013.01); *F25B 2500/22* (2013.01); *F25B 2600/2513* (2013.01); *F25B 2700/2106* (2013.01)

(58) Field of Classification Search
CPC .. F24F 3/001; F24F 11/36; F24F 11/84; F24F 11/86; F24F 2110/12; F25B 13/00; F25B 41/062; F25B 2313/0293; F25B 2341/065; F25B 2500/22; F25B 2600/2513; F25B 2700/2106
See application file for complete search history.

(56) References Cited

U.S. PATENT DOCUMENTS

| 2014/0216685 A1 | 8/2014 | Bicknell |
| 2019/0170385 A1* | 6/2019 | Maddox ................. F24F 11/89 |
| 2020/0049361 A1* | 2/2020 | Minamida ............... F24F 11/36 |

FOREIGN PATENT DOCUMENTS

| EP | 1143209 A1 | 10/2001 |
| EP | 3324138 A1 | 5/2018 |

OTHER PUBLICATIONS

Goel, R. et al., "HVAC System and Method of Circulating Flammable Refrigerant," U.S. Appl. No. 16/162,934, filed Oct. 17, 2018, 30 pages.

(Continued)

*Primary Examiner* — Marc E Norman
(74) *Attorney, Agent, or Firm* — Baker Botts L.L.P.

(57) ABSTRACT

In one embodiment, an HVAC system includes an indoor unit having a furnace, an outdoor heat pump unit having a compressor and an outdoor coil, a refrigerant line coupled to the indoor unit and the outdoor heat pump unit, and an EEV coupled to the refrigerant line. The HVAC system further includes one or more controllers operable to determine an occurrence of a first event, initiate a closure of the EEV, initiate operation of the compressor at a completion of the air conditioning cycle to pump down a refrigerant to the outdoor coil, and cease operation of the compressor when a low-pressure switch is tripped.

17 Claims, 5 Drawing Sheets

(51) Int. Cl.

| | | |
|---|---|---|
| *F24F 11/86* | (2018.01) | |
| *F24F 3/00* | (2006.01) | |
| *F25B 13/00* | (2006.01) | |
| *F24F 11/64* | (2018.01) | |
| *F25B 41/04* | (2006.01) | |
| *F25B 41/06* | (2006.01) | |
| *F25B 45/00* | (2006.01) | |
| *F25B 49/02* | (2006.01) | |
| *F24F 110/12* | (2018.01) | |

(56) References Cited

OTHER PUBLICATIONS

Kowald, G. W. et al., "Refrigerant Pump Down for an HVAC System," U.S. Appl. No. 16/163,260, filed Oct. 17, 2018, 30 pages.
Crawford, C. T. et al., "Systems and Methods for Pumping Down Flammable Refrigerant," U.S. Appl. No. 16/256,319, filed Jan. 24, 2019, 36 pages.
European Patent Office, Extended European Search Report, Application No. 20151763.8, dated Jun. 22, 2020, 11 pages.
European Patent Office, Extended European Search Report, Application No. 20151764.6, dated Jun. 22, 2020, 11 pages.

\* cited by examiner

SYSTEMS AND METHODS FOR PUMPING DOWN FLAMMABLE REFRIGERANT

TECHNICAL FIELD

This disclosure generally relates to a heating, ventilation, and air conditioning (HVAC) system, and more specifically to systems and methods for pumping down flammable refrigerant in the HVAC system.

BACKGROUND

To increase energy efficiency and mitigate emissions of greenhouse gasses, HVAC equipment manufacturers are designing their equipment to operate with flammable refrigerants. A flammable refrigerant leak within an enclosed structure may disperse unsafe concentrations of gas within the enclosed structure. The unsafe concentrations of gas may cause fires, property damage, and injuries to building occupants.

SUMMARY

According to an embodiment, an HVAC system includes an indoor unit having a furnace, an outdoor heat pump unit having a compressor and an outdoor coil, a refrigerant line coupled to the indoor unit and the outdoor heat pump unit, and an EEV coupled to the refrigerant line. The HVAC system further includes one or more controllers operable to determine an occurrence of a first event, initiate a closure of the EEV, initiate operation of the compressor at a completion of the air conditioning cycle to pump down a refrigerant to the outdoor coil, and cease operation of the compressor when a low-pressure switch is tripped.

According to another embodiment, a method includes determining, by one or more controllers, an occurrence of a first event. The occurrence of the first event is associated with an HVAC system that includes an indoor unit, an outdoor heat pump unit, and a refrigerant line coupled to the indoor unit and the outdoor heat pump unit. The method also includes initiating, by the one or more controllers, a closure of an EEV coupled to the refrigerant line and initiating, by the one or more controllers, operation of a compressor of the outdoor heat pump unit at a completion of the air conditioning cycle to pump down a refrigerant to an outdoor coil of the outdoor heat pump unit. The method further includes ceasing operation of the compressor when a low-pressure switch is tripped.

According to yet another embodiment, one or more computer-readable storage media embody instructions that, when executed by a processor, cause the processor to perform operations including determining, by one or more controllers, an occurrence of a first event. The occurrence of the first event is associated with an HVAC system that includes an indoor unit, an outdoor heat pump unit, and a refrigerant line coupled to the indoor unit and the outdoor heat pump unit. The operations also include initiating, by the one or more controllers, a closure of an EEV coupled to the refrigerant line and initiating, by the one or more controllers, operation of a compressor of the outdoor heat pump unit at a completion of the air conditioning cycle to pump down a refrigerant to an outdoor coil of the outdoor heat pump unit. The operations further include ceasing operation of the compressor when a low-pressure switch is tripped.

Technical advantages of this disclosure may include one or more of the following. Embodiments of this disclosure may improve the overall safety of HVAC systems. For example, flammable refrigerant (e.g., A2L refrigerant) may be pumped down to an outdoor unit of an HVAC system at the end of a cooling season. Storing the flammable refrigerant outdoors prevents the flammable refrigerant from leaking indoors, which mitigates the risk of fires, property damage, and injuries to building occupants that may be caused by an indoor flammable refrigerant leak. As another example, pumping down the refrigerant to the outdoor unit in response to a detected flammable refrigerant leak mitigates the risks associated with flammable refrigerant leaks by containing the flammable refrigerant outdoors.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

As flammable refrigerants are introduced into HVAC equipment, techniques are needed to detect and/or mitigate flammable refrigerant leaks. Embodiments of this disclosure provide systems and methods for pumping down flammable refrigerant to an outdoor unit of an HVAC system.

Figure 1:
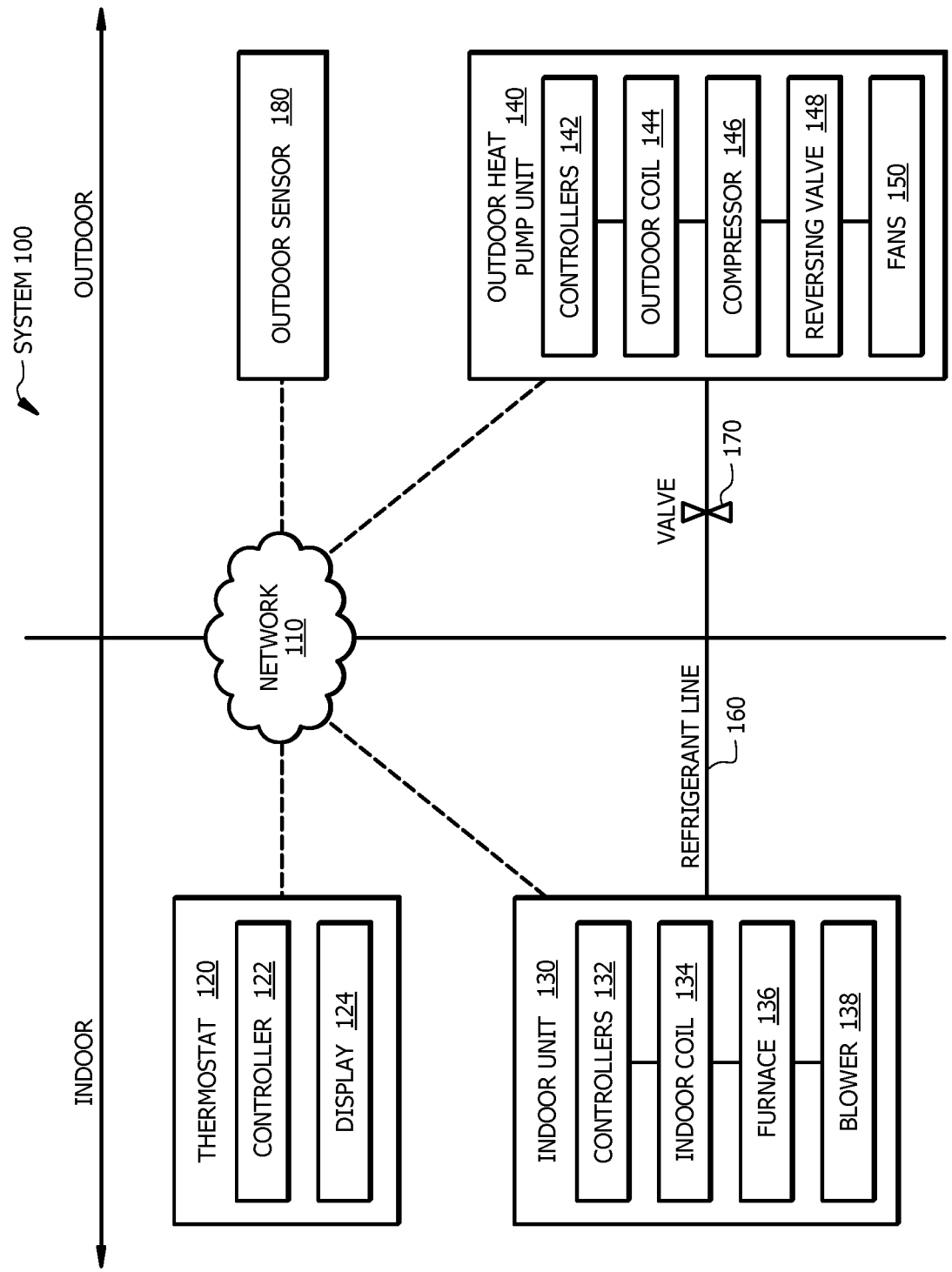
FIG. 1 illustrates an example system for pumping down refrigerant in an HVAC system.
Figure 2:
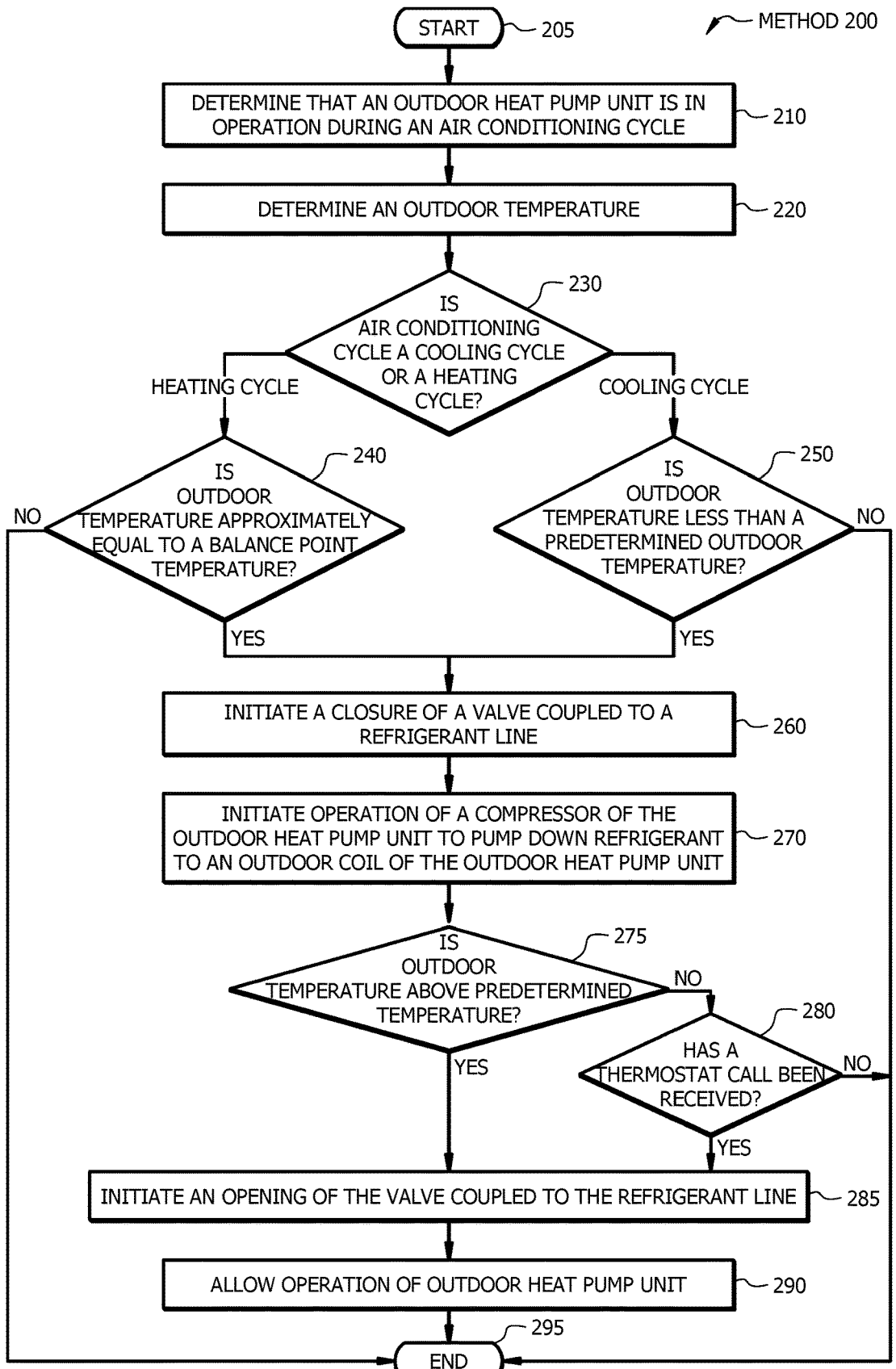
FIG. 2 illustrates an example method for pumping down refrigerant in an HVAC system in response to comparing an outdoor temperature to a predetermined threshold.
Figure 3:
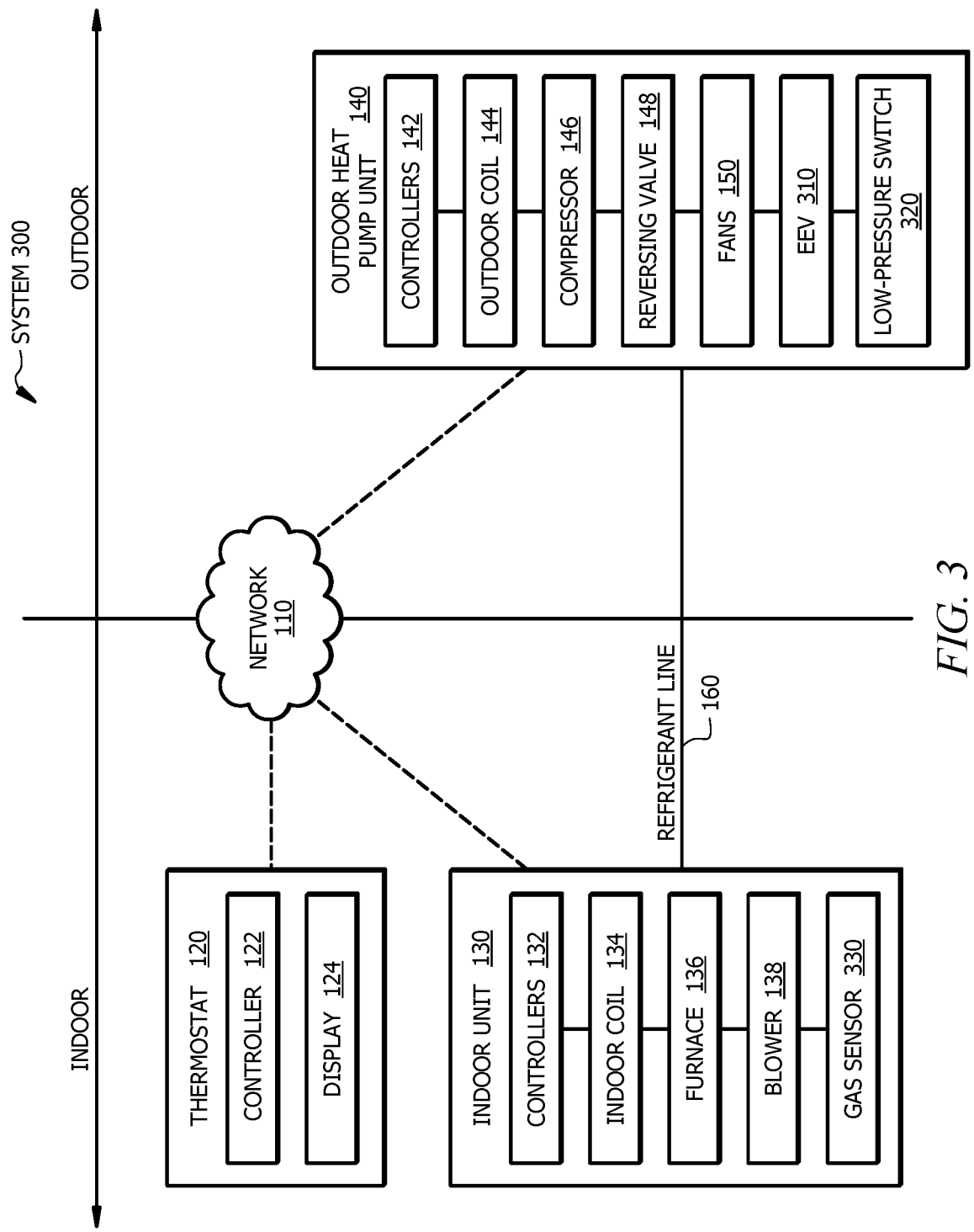
FIG. 3 illustrates an example system for pumping down refrigerant in an HVAC system using an electronic expansion valve (EEV)
Figure 4:
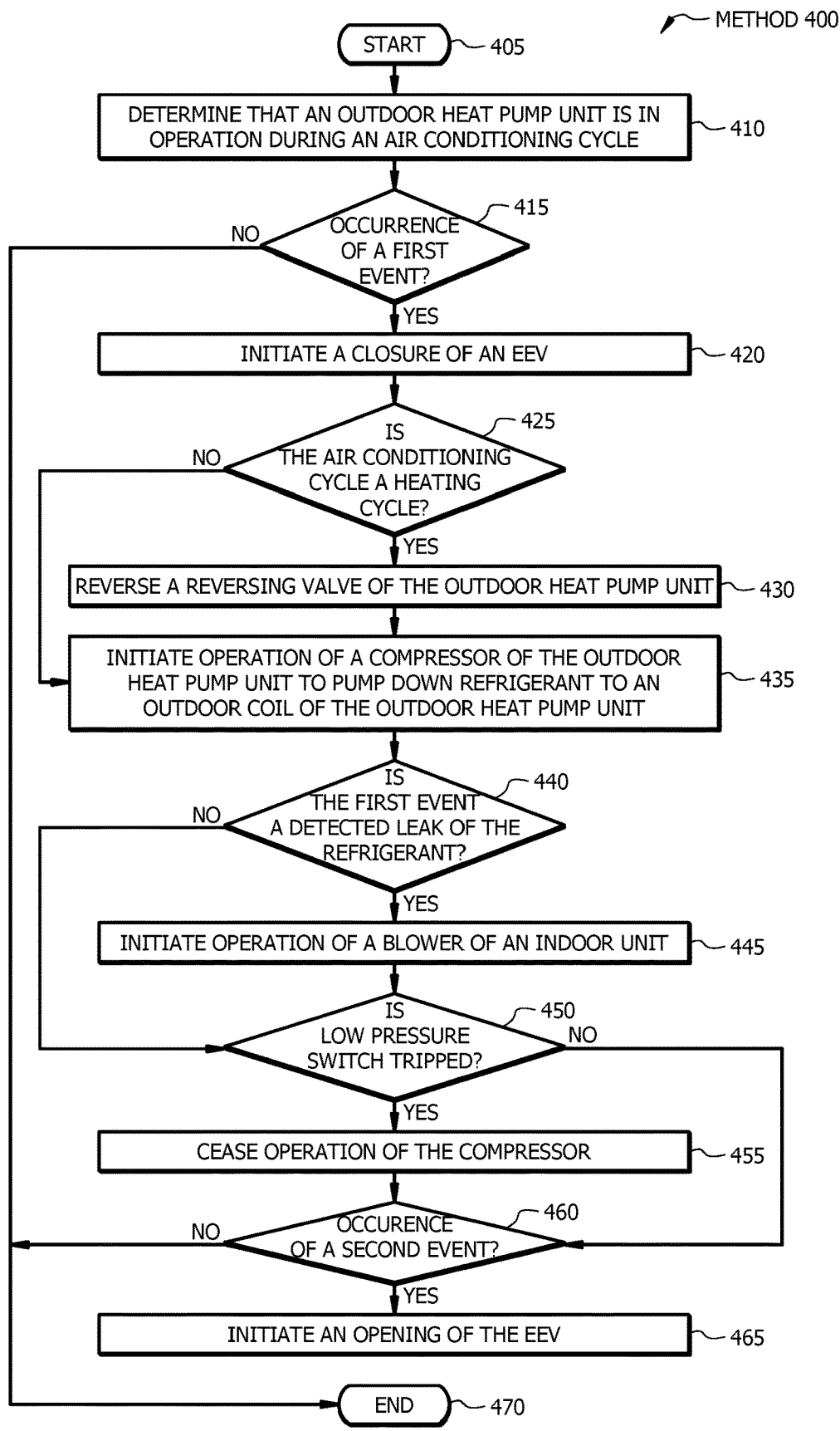
FIG. 4 illustrates an example method for pumping down refrigerant in an HVAC system using an EEV in response to an occurrence of an event.
Figure 5:
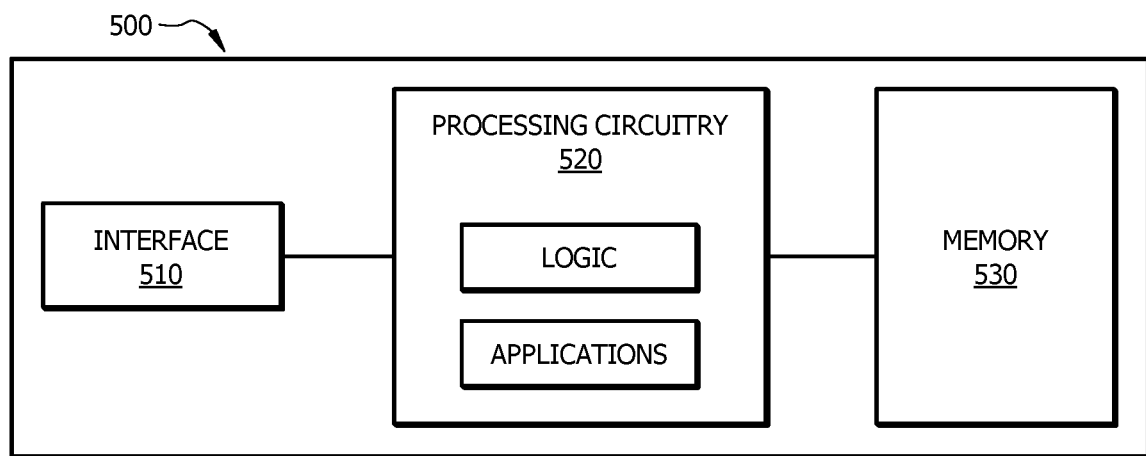
FIG. 5 illustrates an example computer system that may be used by the systems and methods described herein.

FIGS. 1 through 5 show example systems and methods for pumping down refrigerant in an HVAC system. FIG. 1 shows an example system for pumping down refrigerant in an HVAC system and FIG. 2 shows an example method for pumping down refrigerant in an HVAC system in response to comparing an outdoor temperature to a predetermined threshold. FIG. 3 shows an example system for pumping down refrigerant in an HVAC system using an EEV and FIG. 4 shows an example method for pumping down refrigerant in an HVAC system using an EEV in response to an occurrence of an event. FIG. 5 shows an example computer system that may be used by the systems and methods described herein.

FIG. 1 illustrates an example system 100 for pumping down refrigerant in an HVAC system. System 100 of FIG. 1 includes a network 110, a thermostat 120, an indoor unit 130, an outdoor heat pump unit 140, a refrigerant line 160, a valve 170, and an outdoor sensor 180. Thermostat 120 and indoor unit 130 are located in an indoor environment and outdoor heat pump unit 140 and outdoor sensor 180 are located in an outdoor environment. Thermostat 120 of system 100 includes a controller 122 and a display 124. Indoor unit 130 of system 100 includes one or more controllers 132, an indoor coil 134, a furnace 136, and a blower 138. Outdoor heat pump unit 140 includes one or more controllers 142, an outdoor coil 144, a compressor 146, a reversing valve 148, and one or more fans 150. System 100 may use one or more components of computer system 500 (i.e., interface 510, processing circuitry 520, and memory 530), which are described below in FIG. 5. The components of system 100 are described in detail below.

System 100 is an HVAC system that automatically pumps down refrigerant (e.g., mildly flammable refrigerant) to outdoor heat pump unit 140 in response to one or more conditions. Pumping down the flammable refrigerant contains the refrigerant in outdoor heat pump unit 140, which prevents the refrigerant from accumulating in the indoor environment. The pump down procedure for pumping down the refrigerant may include closing valve 170 (e.g., a liquid solenoid valve), operating (e.g., activating) compressor 142 of outdoor heat pump unit 140 to pump down the refrigerant to outdoor coil 144 of outdoor heat pump unit 130, and/or operating (e.g., activating) blower 138 of indoor unit 130. The one or more conditions that trigger the pump down procedure may include a determination that an outdoor temperature is approximately equal to or less than a predetermined threshold (e.g., a predetermined balance point temperature or a predetermined outdoor temperature, respectively).

Network 110 of system 100 may be any type of network that facilitates communication between components of system 100. Network 110 may connect thermostat 120, indoor unit 130, outdoor unit 140, and/or outdoor sensor 180 of system 100. Network 110 may connect the components of system 100 using wireless connections, wired connections, or a combination thereof. Although this disclosure shows network 110 as being a particular kind of network, this disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. Network 110 may be any communications network, such as a private network, a public network, a connection through Internet, a mobile network, a WI-FI network, a Bluetooth network, and the like. One or more components of system 100 may communicate over network 110. For example, thermostat 120 may communicate over network 110, including receiving information from outdoor sensor 180 and transmitting information to indoor unit 130, outdoor heat pump unit 140, and/or valve 170. One or more components of network 110 may include one or more access, core, and/or edge networks. One or more components of network 110 may operate in a cloud environment.

Thermostat 120 of system 100 is a device that automatically regulates temperature within a structure (e.g., an office building or residence) associated with system 100. Thermostat 120 may sense a temperature within the structure and perform actions to maintain the temperature within the structure near a setpoint. Thermostat 120 may be a smart programmable thermostat.

Thermostat 120 may store information in a memory (e.g., memory 530 of FIG. 5). The information may be manually or automatically input into thermostat 120 by a manufacturer of one or more components of system 100, an administrator of system 100, or an occupant of the structure associated with system 100. The information may include one or more values (e.g., predetermined values) that assist controller 122 of thermostat 120 in identifying an end of a season (e.g., an end of a cooling season). Controller 122 may initiate a pump down procedure at the end of the season to sore flammable refrigerant (e.g., A2L refrigerant) in outdoor heat pump unit 140 to mitigate the risk of refrigerant leaks within the structure associated with system 100. The values may include one more balance point temperatures, weather information (e.g., an outdoor temperature), historical data, and/or calendar information. Historical data may include a time when controller 122 last initiated the pump down procedure and/or an average of outdoor temperatures over a period of time (e.g., an hour, a day, a month, or a season). Calendar information may include an identification of a calendar day such as the first or last day of winter. While the information is described as being stored in a memory of thermostat 120, the information may be stored in any memory accessible by controller 122. For example, the information may be stored in a memory of a device (e.g., a tablet, a desktop computer, a smartphone, or a smart TV) or in a cloud environment.

The balance point temperature is a temperature when controller 122 of thermostat 120 switches from operating outdoor heat pump unit 140 to operating furnace 136 to provide heat to the structure of system 100. The balance point temperature is the outdoor air temperature when the heat gains of the structure associated with system 100 are equal to the heat losses. The balance point temperature depends on the design and function of the structure associated with system 100 rather than outdoor weather conditions. The balance point temperature may be determined based on one or more of the following factors: an envelope construction of the structure associated with system 100, thermostat temperature set points, thermostat setback schedules, a quantity of heat-producing equipment of system 100, and a number of occupants in the structure associated with system 100.

Display 124 of thermostat 120 is an electronic device that visually presents information relating to one or more components of system 100. Display 124 may present information such as weather data (e.g., an indoor temperature, an outdoor temperature, average temperatures, etc.), set points, set back schedules, one or more diagrams (e.g., a diagram of one or more components of system 100), a number of occupants in a structure, and the like. Thermostat 120 may include one or more features that allows one or more users (e.g., an occupant of a structure associated with system 100) to interact with display 124. For example, thermostat 120 may include one or more buttons, sliders, switches, touch screens, graphical user interfaces (GUIs), and the like.

Controller 122 of thermostat 120 is any hardware device and/or software program that manages and/or directs the flow of data between two components of system 100. Controller 122 is operable to communicate with one or more components of system 100. In certain embodiments, controller 120 is operable to receive, process, and transmit information. Controller 120 may be communicatively coupled to one or more of network 110, indoor unit 130, outdoor heat pump unit 140, valve 170, and outdoor sensor 180. While controller 122 illustrated as being located within thermostat 120, controller 122 may located externally from thermostat 120. For example, controller 122 may be located in a device (e.g., a tablet, a desktop computer, a smartphone, or a smart TV). Controller 122 may be local to a structure at which each of indoor unit 130, outdoor heat pump unit 140, valve 170, and outdoor sensor 180 are located. Controller 122 may be remote to the location of the structure but coupled to one or more components of the system 100 through network 110. Controller 122 may be configured to receive data from indoor unit 130, outdoor heat pump unit 140, valve 170, and/or outdoor sensor 180.

Controller 122 determines whether outdoor heat pump unit 140 is in operation during an air conditioning cycle. Outdoor heat pump unit 140 is in operation when outdoor heat pump unit 140 is supplying conditioned air to a structure associated with system 100. If the outdoor heat pump unit 140 is in operation, controller 122 determines whether the air conditioning cycle is a heating cycle or a cooling cycle. During the heating cycle, outdoor heat pump unit 140 supplies heated air to the structure associated with system 100. During the cooling cycle, outdoor heat pump unit 140 supplies cooled air to the structure associated with system 100.

Controller 122 determines an outdoor temperature associated with system 100. The outdoor temperature is a temperature of the environment exterior to the structure associated with system 100. Controller 122 may determine the outdoor temperature based on information (e.g., sensor data) received from one or more outdoor sensors 180. Controller 122 may determine the outdoor temperature based on weather information received via network 110 from one or more external sources (e.g., a weather station). The outdoor temperature may represent an outdoor temperature measured at a specific moment in time. The outdoor temperature may represent an average outdoor temperature measured over a specific period of time (e.g., an hour or a day).

When controller 122 determines that the air conditioning cycle is a heating cycle, controller 122 compares the outdoor temperature to a predetermined balance point temperature (e.g., 40 degrees Fahrenheit) and determines, based on the comparison, whether the outdoor temperature is approximately equal to the predetermined balance point temperature. For example, controller 122 may determine that the outdoor temperature is approximately equal to the predetermined balance point temperature if the outdoor temperature is between 39 and 41 degrees Fahrenheit and the predetermined balance point temperature is 40 degrees Fahrenheit. As another example, controller 122 may determine that the outdoor temperature is approximately equal to the predetermined balance point temperature if the outdoor temperature is between 37 and 43 degrees Fahrenheit and the predetermined balance point temperature is 40 degrees Fahrenheit.

When controller 122 determines that the air conditioning cycle is a cooling cycle, controller 122 compares the outdoor temperature to a predetermined outdoor temperature (e.g., 68 degrees) and determines, based on the comparison, whether the outdoor temperature is less than the predetermined outdoor temperature. In response to determining that the outdoor temperature is approximately equal to the predetermined balance point temperature or less than the predetermined outdoor temperature, controller 122 initiates a pump down procedure at the end of the air conditioning cycle. The pump down procedure includes initiating a closure of valve 170 (e.g., a liquid solenoid valve) and initiating operation of compressor 146 to pump down a flammable refrigerant (e.g., an A2L refrigerant) to outdoor coil 144 of outdoor heat pump unit 140. Compressor 146 continues to operate until the flammable refrigerant is pumped down to outdoor coil 144. Outdoor heat pump unit 140 may then shut down until one or more conditions are met. The conditions may include determining that the outdoor temperature is above the predetermined temperature and/or determining that thermostat 120 has received a heating or cooling call.

Controller 122 may initiate operation of one or more components of system 100. For example, controller 122 may initiate operation of furnace 136 and/or blower 138 of indoor unit 130. As another example, controller 122 may initiate operation of compressor 146 and/or fans 150 of outdoor heat pump unit 140. Controller 122 may be a master controller to one or more controllers 132 of indoor unit 130 and/or one or more controllers 142 of outdoor heat pump unit 140. For example, controller 122 may instruct one or more controllers 132 of indoor unit 130 and/or one or more controllers 142 of outdoor heat pump unit 140 to perform one or more actions. Controller 122 may initiate a shut down of one or more components of system 100. For example, controller 122 may initiate a shut down of compressor 146 of outdoor heat pump unit 140 by deactivating compressor 146. Controller 122 may initiate a reversal of reversing valve 148 of outdoor heat pump unit 140. Controller 122 may initiate an opening or closure of valve 170.

Indoor unit 130 of system 100 is any HVAC unit that is located within a structure (e.g., a commercial building or a residence). Indoor unit 110 of system 100 may be located in a closet, in an attic, or in a basement of the structure. While indoor unit 130 is illustrated as including one or more controllers 132, indoor coil 134, furnace 136, and blower 18, indoor unit 130 may include any components suitable for the operation of indoor unit 130.

One or more controllers 132 of indoor unit 130 are hardware devices and/or software programs that manage and/or direct the flow of data between two components of system 100. One or more controllers 132 are operable to communicate with one or more components of system 100. One or more controllers 132 control one or more functions of components of indoor unit 130. For example, one or more controllers 132 of indoor unit 130 may activate furnace 136 and/or blower 138. As another example, one or more controllers 132 of indoor unit 130 may shut down operation of furnace 136 and/or blower 138.

Indoor coil 134 of indoor unit 130 is a component that assists the refrigerant of system 100 in absorbing heat. Indoor coil 134 may include coils and panels. Coils of indoor coil 134 may be made of copper, steel, aluminum, or any other suitable material that can conduct heat. Coils may be formed into any suitable shape (e.g., a series of U-shapes) and placed into the panels. The panels may be lined with fins that allow air to pass over the coils.

When outdoor heat pump unit 140 is in cooling mode, indoor coil 134 operates as an evaporator. The refrigerant passing through indoor coil 134 absorbs heat from the indoor air. The cooled air is pushed through ducts of a structure associated with system 100 to lower an indoor temperature of the structure. When outdoor heat pump unit 140 is in heating mode, indoor coil 134 operates as a condenser. The refrigerant passing through indoor coil 134 absorbs heat from the indoor air. The warmed air is pushed through ducts of a structure to raise an indoor temperature of the structure associated with system 100.

Furnace 136 of indoor unit 110 is any component that provides or assists in providing heat to an indoor environment (e.g., a residential dwelling). Furnace 136 may include a burner, a heat exchanger, a blower (e.g., blower 138), and/or a flue. Furnace 136 may be fueled by gas or electricity. Furnace 136 provides heat to the structure associated with system 100 when outdoor heat pump unit 140 has been shut down.

Outdoor heat pump unit 140 of system 100 is any HVAC unit that is located outdoors. Outdoor heat pump unit 140 of system 100 may be located near a structure housing indoor unit 130. Outdoor heat pump unit 140 may be located in a backyard, in a side yard, on a rooftop, or any other suitable outdoor location. While outdoor heat pump unit 140 is illustrated as including one or more controllers 142, indoor coil 144, compressor 146, reversing valve 148, and fans 150, outdoor heat pump unit 140 may include any components suitable for the operation of outdoor heat pump unit 140.

One or more controllers 142 of outdoor heat pump unit 140 are hardware devices and/or software programs that manage and/or direct the flow of data between two components of system 100. One or more controllers 142 are operable to communicate with one or more components of system 100. One or more controllers 142 control one or more functions of components of outdoor heat pump unit 140. For example, one or more controllers 142 of outdoor heat pump unit 140 may activate compressor 146 and/or fans 150. As another example, one or more controllers 142 of outdoor heat pump unit 140 may shut down operation of compressor 146 and/or fans 150. As still another example, one or more controllers 142 of outdoor heat pump unit 140 may reverse reversing valve 148 to reverse the flow of refrigerant through system 100. In certain embodiments, one or more controllers 142 may shut down outdoor heat pump unit 140 by initiating a command to discontinue operation of outdoor heat pump unit 142.

Outdoor coil 144 of outdoor heat pump unit 140 is any component that is operable to receive and store the refrigerant (e.g., flammable refrigerant) pumped down from compressor 142. When outdoor heat pump unit 140 is in cooling mode, outdoor coil 134 operates as a condenser. When outdoor heat pump unit 140 is in heating mode, outdoor coil 134 operates as an evaporator.

Compressor 146 of outdoor heat pump unit 140 is any component that circulates refrigerant through system 100. Compressor 146 squeezes refrigerant gas, which reduces the volume of the refrigerant gas and turns the refrigerant gas into a high-pressure gas. Compressor 146 may be any suitable type of compressor (e.g., a scroll compressor or a piston compressor) to move refrigerant through system 100. Compressor 146 is operable to pump down refrigerant to outdoor coil 144.

Reversing valve 148 of outdoor heat pump unit 140 changes the flow of refrigerant. Reversing valve 148 may be a 4-way electro-mechanical valve that reverses the refrigerant flow direction using an electrical magnet. When outdoor heat pump unit 140 is in cooling mode, reversing valve 148 is positioned to move refrigerant to outdoor coil 144, through a metering device to drop the pressure of the refrigerant, to indoor coil 134 to cool the inside of a structure associated with system 100, then back to reversing valve 148 in that order. When heat pump unit 140 is in heating mode, reversing valve 148 is positioned to move refrigerant to indoor coil 134 to heat the inside of the structure associated with system 100, through the metering device to drop the pressure of the refrigerant, to outdoor coil 144, and then back to the reversing valve 148 in that order.

One or more fans 150 of outdoor heat pump unit 140 are components operable to blow air across outdoor coil 144. One or more fans 150 include one or more fan motors. Refrigerant line 160 of system 100 connects indoor unit 130 and outdoor heat pump unit 140. Refrigerant line 160 transfers liquid refrigerant unidirectionally between indoor unit 130 and outdoor heat pump unit 140. The refrigerant may be a mildly flammable refrigerant (e.g., an A2L refrigerant), a refrigerant with a lower flammability (e.g., A2 refrigerant), or a refrigerant with a higher flammability (e.g., an A3 refrigerant).

Valve 170 is and device operable to control the passage of refrigerant through refrigerant line 160. Valve 170 is coupled (e.g., physically connected) to refrigerant line 160. Valve 170 is operable to prevent the refrigerant from flowing to indoor unit 130. Valve 170 may be operated manually or electronically. Valve 170 may be controlled by one or more controllers (e.g., controller 122, controllers 132, or controllers 142). Valve 170 may be an electromechanical actuated valve (e.g., a liquid solenoid valve).

Outdoor sensor 180 of system 100 is any device that provides for temperature measurement through an electronic signal. Outdoor sensor 180 detects an outdoor temperature. Outdoor sensor 180 may use an external diode-connected transistor as a sensing element to measure temperatures external to outdoor sensor 180. Outdoor sensor 180 may produce sensor data (e.g., digital output) and transmit the sensor data to controller 122 of thermostat 120.

Although FIG. 1 illustrates a particular arrangement of network 110, thermostat 120, controller 122, display 124, indoor unit 130, controllers 132, indoor coil 134, furnaces 136, blower 138, outdoor heat pump unit 140, controllers 142, outdoor coil 144, compressor 146, reversing valve 148, fans 150, refrigerant line 160, valve 170, and outdoor sensor 180, this disclosure contemplates any suitable arrangement of network 110, thermostat 120, controller 122, display 124, indoor unit 130, controllers 132, indoor coil 134, furnaces 136, blower 138, outdoor heat pump unit 140, controllers 142, outdoor coil 144, compressor 146, reversing valve 148, fans 150, refrigerant line 160, valve 170, and outdoor sensor 180. Network 110, thermostat 120, controller 122, display 124, indoor unit 130, controllers 132, indoor coil 134, furnaces 136, blower 138, outdoor heat pump unit 140, controllers 142, outdoor coil 144, compressor 146, reversing valve 148, fans 150, refrigerant line 160, valve 170, and outdoor sensor 180 may be physically or logically co-located with each other in whole or in part.

This disclosure recognizes that system 100 may include (or exclude) one or more components and the components may be arranged in any suitable order. For example, an air conditioner unit (e.g., a condenser) may replace outdoor heat pump unit 140 in certain embodiments. Given the teachings herein, one skilled in the art will understand that system 100 may include additional components and devices that are not presently illustrated or discussed but are typically included in an HVAC system such as a power supply, ducts, and so on.

Although FIG. 1 illustrates a particular number of networks 110, thermostats 120, controllers 122, displays 124, indoor units 130, controllers 132, indoor coils 134, furnaces 136, blowers 138, outdoor heat pump units 140, controllers 142, outdoor coils 144, compressors 146, reversing valves 148, fans 150, refrigerant lines 160, valves 170, and outdoor sensors 180, this disclosure contemplates any suitable number of networks 110, thermostats 120, controllers 122, displays 124, indoor units 130, controllers 132, indoor coils 134, furnaces 136, blowers 138, outdoor heat pump units 140, controllers 142, outdoor coils 144, compressors 146, reversing valves 148, fans 150, refrigerant lines 160, valves 170, and outdoor sensors 180. For example, system 100 may include multiple thermostats 120, indoor units 130, outdoor heat pump units 140, and outdoor sensors 140.

In operation, controller 122 of thermostat 120 determines that outdoor heat pump unit 140 is in operation (e.g., providing heating or cooling to a structure associated with system 100) during an air conditioning cycle. Controller 122 determines an outdoor temperature (e.g., 65 degrees) from data received from outdoor sensor 180. If the air conditioning cycle is a heating cycle, controller 122 compares the outdoor temperature to a predetermined balance point temperature (e.g., 40 degrees) and determines, based on the comparison, whether the outdoor temperature is approximately equal to the predetermined balance point temperature. If the air conditioning cycle is a cooling cycle, controller 122 compares the outdoor temperature to a predetermined outdoor temperature (e.g., 68 degrees) and determines, based on the comparison, whether the outdoor temperature is less than the predetermined outdoor temperature. In response to determining that the outdoor temperature is approximately equal to the predetermined balance point temperature or less than the predetermined outdoor temperature, controller 122 initiates a pump down procedure at the end of the air conditioning cycle by initiating a closure of valve 170 (e.g., a liquid solenoid valve) and initiating operation of compressor 146 to pump down a flammable refrigerant (e.g., an A2L refrigerant) to outdoor coil 144 of outdoor heat pump unit 140. After the pump down procedure is completed, controller 122 discontinues operation of outdoor heat pump unit 140. Outdoor heat pump unit 140 remains shut down until controller 122 determines one or more conditions. The conditions may include determining that the outdoor temperature is above the predetermined temperature and/or determining that a thermostat call (e.g., a heating or cooling call) has been received by thermostat 120.

As such, system 100 of FIG. 1 initiates a pump down procedure at the end of a season to store flammable refrigerant outdoors, which mitigates the risks associated with flammable refrigerant leaks within a structure.

FIG. 2 illustrates an example method 200 for pumping down refrigerant in an HVAC system in response to comparing an outdoor temperature to a predetermined threshold. Method 200 begins at step 205. At step 210, a controller (e.g., controller 122 of FIG. 1) determines that an outdoor heat pump unit (e.g., outdoor heat pump unit 140 of FIG. 1) is in operation during an air conditioning cycle (e.g., a heating or cooling cycle). The controller may be a component of a thermostat (e.g., thermostat 120 of FIG. 1). At step 220, the controller determines an outdoor temperature. Controller 122 may determine the outdoor temperature from data received from outdoor sensor 180 and/or from data (e.g., weather forecast data) received via network 110.

At step 230, controller 122 determines whether the air conditioning cycle is a heating cycle or a cooling cycle. If the air conditioning cycle is a heating cycle, method 200 advances from step 230 to step 240, where the controller compares the outdoor temperature to a predetermined balance point temperature (e.g., 40 degrees) and determines, based on the comparison, whether the outdoor temperature is approximately equal to (e.g., within one degree Fahrenheit) the predetermined balance point temperature. The predetermined balance point temperature may be stored in a memory of a device (e.g., a thermostat) housing the controller. If the controller determines that the outdoor temperature is approximately equal to the predetermined balance point temperature, method 200 moves from step 240 to step 260, where the controller initiates a pump down procedure. If the controller determines that the outdoor temperature is not approximately equal to the predetermined balance point temperature, method 200 advances from step 240 to step 295, where method 200 ends.

If controller 122 determines at step 230 that the air conditioning cycle is a cooling cycle, method 200 advances from step 230 to step 250, where the controller compares the outdoor temperature to a predetermined outdoor temperature (e.g., 68 degrees) and determines, based on the comparison, whether the outdoor temperature is less than the predetermined outdoor temperature. The predetermined outdoor temperature may be stored in a memory of a device (e.g., a thermostat) housing the controller. If the controller determines that the outdoor temperature is less than the predetermined outdoor temperature, method 200 advances from step 250 to step 260, where the controller initiates a pump down procedure. If the controller determines that the outdoor temperature is not less than the predetermined outdoor temperature, method 200 advances from step 250 to step 295, where method 200 ends.

The controller initiates the pump down procedure at steps 260 and 270. At step 260, the controller initiates a closure of a valve (e.g., valve 170 of FIG. 1) coupled to a refrigerant line of the HVAC system (e.g., system 100 of FIG. 1), which prevents flammable refrigerant from flowing into the indoor environment associated with the HVAC system. At step 270, the controller initiates operation (e.g., activation) of a compressor (e.g., compressor 146 of FIG. 1) of an outdoor heat pump unit (e.g., outdoor heat pump unit 140 of FIG. 1) to pump down the flammable refrigerant (e.g., an A2L refrigerant) to an outdoor coil (e.g., outdoor coil 144 of FIG. 1) of the outdoor heat pump unit. The compressor continues to operate until the refrigerant is pumped down to the outdoor coil.

At step 275, the controller determines whether the outdoor temperature is at or above the predetermined temperature (e.g., the balance point temperature or the predetermined outdoor temperature). If the outdoor temperature is below the predetermined temperature, method 200 advances from step 275 to step 2980, where the controller determines if a thermostat call (e.g., a heating or cooling call) has been received. If a thermostat call has not been received, method 200 advances from step 280 to step 295, where method 200 ends.

If the outdoor temperature is at or above the predetermined temperature, method 200 advances from step 275 to step 285. If a thermostat call has been received, method 200 advances from step 280 to step 285. At step 285, the controller initiates an opening of the valve coupled to the refrigerant line. The opening of the valve allows the flammable refrigerant to flow into the indoor unit of the HVAC system. Method 200 then advances to step 290, where the controller sends a command to allow operation of the outdoor heat pump unit. For example, the controller may send a command that reconnects the outdoor heat pump unit with its power source. Method 200 then moves to step 295, where method 200 ends.

Modifications, additions, or omissions may be made to method 200 depicted in FIG. 2. For example, at step 210, the controller may determine that an air conditioner unit (rather than a heat pump) is in operation during the air conditioning cycle. Method 200 may include more, fewer, or other steps. For example, method 200 may include an additional step to receiving sensor data from an outdoor sensor (e.g., outdoor sensor 180). As another example, method 200 may include an additional step of determining whether the refrigerant used in the HVAC system is a flammable refrigerant. Steps may also be performed in parallel or in any suitable order. For example, step 210 directed to determining that the outdoor heat pump unit is in operation during an air conditioning cycle may occur after step 220 directed to determining the outdoor temperature. While discussed as specific components completing the steps of method 200, any suitable component of the HVAC system may perform any step of method 200. For example, multiple controllers may perform one or more steps of method 200.

FIG. 3 illustrates an example system 300 for pumping down refrigerant in an HVAC system using an EEV. System 300 of FIG. 3 includes network 110, thermostat 120, indoor unit 130, outdoor heat pump unit 140, and refrigerant line 160, which are described above in FIG. 1. Thermostat 120 includes controller 122 and display 124, indoor unit 130 includes one or more controllers 132, indoor coil 134, furnace 136, and blower 138, and outdoor heat pump unit 140 includes one or more controllers 142, outdoor coil 144, compressor 146, reversing valve 148, and one or more fans 150, which are described above in FIG. 1. Outdoor heat pump unit 140 of system 300 additionally includes an EEV 310 and a low-pressure switch 320. Indoor unit 130 additionally includes a gas sensor 330. System 300 may use one or more components computer system 500 (i.e., interface 510, processing circuitry 520, and memory 530), which are described below in FIG. 5. The additional components of system 300 are described in detail below.

System 300 is an HVAC system that automatically pumps down refrigerant (e.g., mildly flammable refrigerant) to outdoor heat pump unit 140 in response to an occurrence of an event. Pumping down the flammable refrigerant contains the refrigerant in outdoor heat pump unit 140, which prevents the refrigerant from accumulating in the indoor environment. The pump down procedure for pumping down the refrigerant may include closing valve 170 (e.g., a liquid solenoid valve), operating (e.g., activating) compressor 142 of outdoor heat pump unit 140 to pump down the refrigerant to outdoor coil 144 of outdoor heat pump unit 130, and/or operating (e.g., activating) blower 138 of indoor unit 130. The one or more events that trigger the pump down procedure may include a detected leak of the flammable refrigerant or a determination that a predetermined calendar date has occurred.

EEV 310 of system 300 is an electronic expansion valve that controls the flow rate of refrigerant in response to a signal received from a controller (e.g., controller 142). EEV 310 may include a motor to open and close a port of EEV 310. EEV 310 regulates an amount of refrigerant passing through the port. EEV 310 may provide bidirectional operation to control the flow rate of the refrigerant in heating and cooling mode. While the illustrated embodiment of FIG. 3 shows EEV 310 located within outdoor heat pump unit 140, EEV 310 may be located in any suitable location to control the flow of refrigerant between indoor unit 130 and outdoor heat pump unit 140. EEV 310 may be used to prevent flammable refrigerant from flowing into an indoor environment. Because certain outdoor heat pump units 140 include EEV 310, system 300 may not require the installation of an additional valve to prevent flammable refrigerant from flowing into the indoor environment.

Outdoor heat pump unit 140 may include one or more pressure switches. Low-pressure switch 320 is a device (e.g., an electromechanical, solid state, or electronic device) capable of detecting a pressure change. Low-pressure switch 320 opens or closes an electrical contact when the detected pressure reaches a predetermined level. Low-pressure switch 320 may be a protective device for compressor 146 that is tripped in response to low refrigerant charge. Low refrigerant charge may result from a leak of the refrigerant. When low-pressure switch 320 is tripped, compressor 146 of outdoor heat pump unit 140 ceases operation. Low-pressure switch 320 may be tripped in response to failure of one or more components (e.g., blower 138 of indoor unit 130) of system 100, a plugged indoor coil 134, a plugged outdoor coil 144, and/or a blockage of air flow. Low-pressure switch 320 may be an automatic reset switch that resets itself when a pressure of system 300 returns to normal (e.g., above a predetermined pressure setting of low-pressure switch 320). When low-pressure switch 320 is reset, compressor 146 may be activated. While low-pressure switch 320 is located in outdoor heat pump unit 140 in the illustrated embodiment, low-pressure switch 320 may be located in any suitable location to cease operation of compressor 146.

Gas sensor 330 is a sensor that detects gas within an environment. Gas sensor 330 may be a flammable gas sensor that detects gas resulting from a refrigerant leak in system 300. Gas sensor 330 may detect that a gas concentration of an indoor environment equals or exceeds a predetermined threshold. For example, the predetermined threshold may be a lower flammability limit (LFL) of a particular refrigerant (e.g., A2L refrigerant) as determined by one or more regulations, and gas sensor 330 may detect that the gas concentration of the indoor environment is equal to or greater than the LFL.

Controller 122 of system 100, which may be a component of thermostat 120 or a component of another device, determines one or more occurrences of one or more events. The events may include a determination that a predetermined calendar date has occurred. For example, an event may be the occurrence of the first or last day of winter. The events may include a determination that a refrigerant leak has been detected. For example, controller 122 may receive a signal from gas sensor 330 indicating an unsafe gas concentration level within a structure associated with system 300. The events may include a determination that a refrigerant leak has been mitigated. For example, controller 122 may receive a signal from gas sensor 330 indicating a gas concentration level within the structure associated with system 300 is at a safe level.

Controller 122 may initiate a closure of EEV 310 in response to the occurrence of a first event (e.g., a detected flammable refrigerant leak or a determination that a first calendar date has occurred). Controller 122 may initiate operation of compressor 146 of outdoor heat pump unit 140 in response to the occurrence of the first event. If the event is a detected flammable refrigerant leak, controller 122 initiates operation of blower 138 of indoor unit 130. The operation of blower 138 may assist in diluting the leaked refrigerant in an attempt to prevent the refrigerant from pooling up in any area of the system compartments, ducting, and/or conditioned space. If the event is not a detected flammable refrigerant leak, controller 122 is not required to initiate operation of blower 138 of indoor unit 130. Controller 122 may initiate an opening of EEV 310 in response to the occurrence of a second event (e.g., a mitigated flammable refrigerant leak or a determination that a second calendar date has occurred).

Controller 122 may determine whether outdoor heat pump unit 140 is in operation during an air conditioning cycle (e.g., a heating or cooling cycle). If controller 122 determines that outdoor heat pump unit 140 is in operation during a heating cycle, controller 122 may reverse reversing valve 148 of outdoor heat pump unit 140 from the heating cycle to the cooling cycle as part of the pump down procedure. Controller 122 may reverse reversing valve 148 prior to initiating the operation of compressor 146 to pump down the refrigerant. Controller 122 of system 300 may determine whether low-pressure switch 320 has been tripped. Controller 122 may cease operation of compressor 146 of outdoor heat pump unit 140 when low-pressure switch 320 is tripped.

Although FIG. 3 illustrates a particular arrangement of network 110, thermostat 120, controller 122, display 124, indoor unit 130, controllers 132, indoor coil 134, furnace 136, blower 138, gas sensor 330, outdoor heat pump unit 140, controllers 142, outdoor coil 144, compressor 146, reversing valve 148, fans 150, EEV 310, low-pressure switch 320, and refrigerant line 160, this disclosure contemplates any suitable arrangement of network 110, thermostat 120, controller 122, display 124, indoor unit 130, controllers 132, indoor coil 134, furnace 136, blower 138, gas sensor 330, outdoor heat pump unit 140, controllers 142, outdoor coil 144, compressor 146, reversing valve 148, fans 150, EEV 310, low-pressure switch 320, and refrigerant line 160. Network 110, thermostat 120, controller 122, display 124, indoor unit 130, controllers 132, indoor coil 134, furnace 136, blower 138, gas sensor 330, outdoor heat pump unit 140, controllers 142, outdoor coil 144, compressor 146, reversing valve 148, fans 150, EEV 310, low-pressure switch 320, and refrigerant line 160 may be physically or logically co-located with each other in whole or in part. This disclosure recognizes that system 300 may include (or exclude) one or more components and the components may be arranged in any suitable order. Given the teachings herein, one skilled in the art will understand that system 300 may include additional components and devices that are not presently illustrated or discussed but are typically included in an HVAC system such as a power supply, ducts, and so on.

Although FIG. 3 illustrates a particular number of networks 110, thermostats 120, controllers 122, displays 124, indoor units 130, controllers 132, indoor coils 134, furnaces 136, blowers 138, gas sensors 320, outdoor heat pump units 140, controllers 142, outdoor coils 144, compressors 146, reversing valves 148, fans 150, EEVs 310, low-pressure switches 320, and refrigerant lines 160, this disclosure contemplates any suitable number of networks 110, thermostats 120, controllers 122, displays 124, indoor units 130, controllers 132, indoor coils 134, furnaces 136, blowers 138, gas sensors 320, outdoor heat pump units 140, controllers 142, outdoor coils 144, compressors 146, reversing valves 148, fans 150, EEVs 310, low-pressure switches 320, and refrigerant lines 160. For example, system 100 may include multiple thermostats 120, indoor units 130, outdoor heat pump units 140, and gas sensors 320.

In operation, controller 122 of thermostat 120 determines an occurrence of a first event (e.g., a detected refrigerant leak or a determination that a calendar date has occurred). In response to determining the occurrence of the event, controller 122 initiates a pump down procedure by initiating a closure of EEV 320 and initiating operation of compressor 146 to pump down a flammable refrigerant (e.g., an A2L refrigerant) to outdoor coil 144 of outdoor heat pump unit 140. In the event low-pressure switch 320 is tripped, controller 122 shuts down operation of compressor 146. After the pump down procedure is completed, controller 122 shuts down operation of compressor 146. Outdoor heat pump unit 140 remains inactive until an occurrence of a second event (e.g., a determination that the refrigerant leak has been mitigated or a determination that a second calendar date has occurred). Upon the occurrence of the second event, controller 122 initiates an opening of EEV 320 to allow the flammable refrigerant to flow to indoor unit 130.

As such, system 300 of FIG. 3 initiates a pump down procedure in response to an occurrence of an event to store flammable refrigerant outdoors, which mitigates the risks associated with flammable refrigerant leaks within a structure.

FIG. 4 illustrates an example method 400 for pumping down refrigerant using an EEV in an HVAC system in response to an occurrence of an event. Method 400 begins at step 405. At step 410, a controller (e.g., controller 122 of FIG. 3) determines that an outdoor heat pump unit (e.g., outdoor heat pump unit 140 of FIG. 3) is in operation during an air conditioning cycle. At step 415, the controller determines whether a first event has occurred. The first event may be a detected flammable refrigerant leak or a determination that a calendar date (e.g., the first day of winter) has occurred. If the controller determines that a first event has not occurred, method 4000 advances from step 415 to step 470, where method 400 ends.

If the controller determines that a first event has occurred, method 400 advances from step 415 to 420, where the pump down procedure is initiated. At step 420, the controller initiates a closure of an EEV (e.g., EEV 310 of FIG. 3). Method 400 then advances to step 425, where the controller determines whether the air conditioning cycle of step 410 is a heating cycle. If the air conditioning cycle is not a heating cycle (e.g., if the air conditioning cycle is a cooling cycle), method 400 advances from step 425 to step 435. If the air conditioning cycle is a heating cycle, method 400 advances from step 425 to step 430, where the controller initiates a reversal of a reversing valve (e.g., reversing valve 148 of FIG. 3) of an outdoor heat pump unit (e.g., outdoor heat pump unit 140 of FIG. 3).

At step 435, the controller initiates operation (e.g., activation) of a compressor (e.g., compressor 146 of FIG. 3) of the outdoor heat pump unit to pump down the flammable refrigerant (e.g., an A2L refrigerant) to an outdoor coil (e.g., outdoor coil 144 of FIG. 3) of the outdoor heat pump unit. Method 400 then advances to step 440, where the controller determines if the first event is a detected leak of the flammable refrigerant. If the first event is not a detected leak of the flammable refrigerant, method 400 advances from step 440 to steep 450, bypassing step 445. If the first event is a detected leak of the flammable refrigerant, method 400 advances from step 440 to step 445, where the controller initiates operation of a blower (e.g., blower 138 of FIG. 3) of an indoor unit (e.g., indoor unit 130 of FIG. 3).

At 450, where the controller determines whether a low-pressure switch (e.g., low-pressure switch 320 of FIG. 3) has been tripped. If the low-pressure switch has not been tripped, method 400 advances from step 450 to step 460. If the low-pressure switch has been tripped, method 400 advances from step 450 to step 455, where the controller initiates a shut down of the compressor.

At step 460, the controller determines if a second event has occurred. The second event may be a determination that the refrigerant leak has been mitigated or a determination that a second calendar date has occurred. If the second event has not occurred, method 400 moves from step 460 to step 470, where method 400 ends. If the second event has occurred, method advances from step 460 to step 465, where the controller initiates an opening of the EEV. Method 400 then advances to step 470, where method 400 ends.

Modifications, additions, or omissions may be made to method 400 depicted in FIG. 4. Method 400 may include more, fewer, or other steps. For example, method 400 may include an additional step of shutting down or locking out the compressor. As another example, method 400 may eliminate steps 410, 425, and 230 directed to the air conditioning cycles. Steps may also be performed in parallel or in any suitable order. For example, step 410 directed to determining that the outdoor heat pump unit is in operation during an air conditioning cycle may occur after steps 415 and 420.

While discussed as specific components completing the steps of method 400, any suitable component of the HVAC system may perform any step of method 400.

FIG. 5 shows an example computer system 500 that may be used by the systems and methods described herein. For example, one or more components of system 100 of FIG. 1 and system 300 of FIG. 3 (e.g., controllers 122, 132, and 142 of FIGS. 1 and 3) may include one or more interface(s) 510, processing circuitry 520, memory(ies) 530, and/or other suitable element(s). Interface 510 receives input, sends output, processes the input and/or output, and/or performs other suitable operation. Interface 510 may comprise hardware and/or software.

Processing circuitry 520 performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A heating, ventilation, and air conditioning (HVAC) system, comprising:
an indoor unit comprising a furnace;
an outdoor heat pump unit comprising a compressor and an outdoor coil;
a refrigerant line coupled to the indoor unit and the outdoor heat pump unit;
an electronic expansion valve (EEV) coupled to the refrigerant line; and
one or more controllers operable to:
determine an occurrence of a first event;
initiate a closure of the EEV;
initiate operation of the compressor at a completion of an air conditioning cycle to pump down a refrigerant to the outdoor coil;
cease operation of the compressor when a low-pressure switch is tripped;
initiate a command to discontinue operation of the outdoor heat pump unit;
determine that an outdoor temperature is greater than or equal to a predetermined temperature;
initiate an opening of the EEV in response to determining that the outdoor temperature is greater than or equal to the predetermined temperature; and
initiate a command to permit operation of the heat pump unit in response to determining that the outdoor temperature is greater than or equal to the predetermined temperature.

2. The HVAC system of claim 1, wherein:
the first event is a determination that a predetermined calendar date has occurred; and
a blower of the indoor unit is not activated in response to the occurrence of the first event.

3. The HVAC system of claim 1, wherein:
the first event is a detected leak of the refrigerant; and
the one or more controllers are further operable to initiate operation of a blower of the indoor unit in response to the occurrence of the first event.

4. The HVAC system of claim 1, the one or more controllers further operable to:
determine an occurrence of a second event, wherein the second event is one of the following:
a determination that a predetermined calendar date has occurred; and a determination that a refrigerant leak has been mitigated; and initiate an opening of the EEV in response to the occurrence of the second event.

5. The HVAC system of claim 1, wherein:
the one or more controllers are one or more controllers of a thermostat; and
the refrigerant is a flammable refrigerant.

6. The HVAC system of claim 1, wherein the one or more controllers are further operable to:
determine that the outdoor heat pump unit is in operation during a heating cycle; and
reverse a reversing valve of the outdoor heat pump unit from the heating cycle to the cooling cycle prior to initiating the operation of the compressor to pump down the refrigerant.

7. A method, comprising:
determining, by one or more controllers, an occurrence of a first event, wherein the occurrence of the first event is associated with a heating, ventilation, and air conditioning (HVAC) system comprising an indoor unit, an outdoor heat pump unit, and a refrigerant line coupled to the indoor unit and the outdoor heat pump unit;
initiating, by the one or more controllers, a closure of an electronic expansion valve (EEV) coupled to the refrigerant line;
initiating, by the one or more controllers, operation of a compressor of the outdoor heat pump unit at a completion of an air conditioning cycle to pump down a refrigerant to an outdoor coil of the outdoor heat pump unit;
ceasing operation of the compressor when a low-pressure switch is tripped;
initiating, by the one or more controllers, a command to discontinue operation of the outdoor heat pump unit;
determining, by the one or more controllers, that an outdoor temperature is greater than or equal to a predetermined temperature;
initiating, by the one or more controllers, an opening of the EEV in response to determining that the outdoor temperature is greater than or equal to the predetermined temperature; and
initiating, by the one or more controllers, a command to permit operation of the heat pump unit in response to determining that the outdoor temperature is greater than or equal to the predetermined temperature.

8. The method of claim 7, wherein:
the first event is a determination that a predetermined calendar date has occurred; and
a blower of the indoor unit is not activated in response to the occurrence of the first event.

9. The method of claim 7, wherein:
the first event is a detected leak of the refrigerant; and
the one or more controllers initiate operation of a blower of the indoor unit in response to the occurrence of the first event.

10. The method of claim 7, further comprising:
determining, by the one or more controllers, an occurrence of a second event, wherein the second event is one of the following:
a determination that a predetermined calendar date has occurred; and
a determination that a refrigerant leak has been mitigated; and
initiating an opening of the EEV in response to the occurrence of the second event.

11. The method of claim 7, wherein:
the one or more controllers are one or more controllers of a thermostat; and
the refrigerant is a flammable refrigerant.

12. The method of claim 7, further comprising:
determining, by the one or more controllers, that the outdoor heat pump unit is in operation during a heating cycle; and
reversing, by the one or more controllers, a reversing valve of the outdoor heat pump unit from the heating cycle to the cooling cycle prior to initiating the operation of the compressor to pump down the refrigerant.

13. One or more computer-readable storage media embodying instructions that, when executed by a processor, cause the processor to perform operations comprising:
determining, by one or more controllers, an occurrence of a first event, wherein the occurrence of the first event is associated with a heating, ventilation, and air conditioning (HVAC) system comprising an indoor unit, an outdoor heat pump unit, and a refrigerant line coupled to the indoor unit and the outdoor heat pump unit;
initiating, by the one or more controllers, a closure of an electronic expansion valve (EEV) coupled to the refrigerant line;
initiating, by the one or more controllers, operation of a compressor of the outdoor heat pump unit at a completion of an air conditioning cycle to pump down a refrigerant to an outdoor coil of the outdoor heat pump unit;
ceasing operation of the compressor when a low-pressure switch is tripped;
initiating, by the one or more controllers, a command to discontinue operation of the outdoor heat pump unit;
determining, by the one or more controllers, that an outdoor temperature is greater than or equal to a predetermined temperature;
initiating, by the one or more controllers, an opening of the EEV in response to determining that the outdoor temperature is greater than or equal to the predetermined temperature; and
initiating, by the one or more controllers, a command to permit operation of the heat pump unit in response to determining that the outdoor temperature is greater than or equal to the predetermined temperature.

14. The one or more computer-readable storage media of claim 13, wherein:
the first event is a determination that a predetermined calendar date has occurred; and
a blower of the indoor unit is not activated in response to the occurrence of the first event.

15. The one or more computer-readable storage media of claim 13, wherein:
the first event is a detected leak of the refrigerant; and
the one or more controllers initiate operation of a blower of the indoor unit in response to the occurrence of the first event.

16. The one or more computer-readable storage media of claim 13, the operations further comprising:
determining, by the one or more controllers, an occurrence of a second event, wherein the second event is one of the following:
a determination that a predetermined calendar date has occurred; and
a determination that a refrigerant leak has been mitigated; and
initiating an opening of the EEV in response to the occurrence of the second event.

17. The one or more computer-readable storage media of claim 13, wherein:
  the one or more controllers are one or more controllers of a thermostat; and
  the refrigerant is a flammable refrigerant.

\* \* \* \* \*